US012447878B2

(12) United States Patent
Ive et al.

(10) Patent No.: US 12,447,878 B2
(45) Date of Patent: Oct. 21, 2025

(54) SEAT FOR A VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Luca Dusini, Modena (IT); Marcello Pergola, Modena (IT)

(73) Assignee: FERRARI S.P.A., Modena (IT)

( * ) Notice: Subject to any disclaimer, the term of this patent is extended or adjusted under 35 U.S.C. 154(b) by 192 days.

(21) Appl. No.: 18/498,562

(22) Filed: Oct. 31, 2023

(65) Prior Publication Data
US 2024/0149764 A1    May 9, 2024

(30) Foreign Application Priority Data

Nov. 4, 2022   (IT) .......................... 102022000022743

(51) Int. Cl.
*B60N 2/60* (2006.01)
*A47C 31/00* (2006.01)

(52) U.S. Cl.
CPC .......... *B60N 2/6018* (2013.01); *A47C 31/003* (2013.01)

(58) Field of Classification Search
CPC .................................................. B60N 2/6018
See application file for complete search history.

(56) References Cited

U.S. PATENT DOCUMENTS 9,845,033 B1 * 12/2017 Umlauf ................ B60N 2/6018
2008/0061610 A1    3/2008 Tache

FOREIGN PATENT DOCUMENTS

| FR | 2850848 A1 | 8/2004 |
| FR | 3014780 A1 | 6/2015 |
| JP | H11113690 A | 4/1999 |

OTHER PUBLICATIONS

Italian Search Report for Application No. 202200022743; Filing Date: Nov. 4, 2022; Date of Mailing: May 4, 2023; 6 pages.

* cited by examiner

*Primary Examiner* — Anthony D Barfield
(74) *Attorney, Agent, or Firm* — CANTOR COLBURN LLP

(57) ABSTRACT

Seat for a vehicle and having: a base structure configured to be fixed to a floorboard of the vehicle; and a cover that covers the base structure and constitutes the outermost part of the seat. The cover has at least one reversible component which is fixed to the rest of the seat in a separable manner and has two opposite faces, each capable of being arranged outwards or, alternatively, inwards reversing the orientation of the reversible component.

17 Claims, 2 Drawing Sheets

SEAT FOR A VEHICLE

CROSS-REFERENCE TO RELATED APPLICATIONS

This patent application claims priority from Italian patent application no. 102022000022743 filed on 4 Nov. 2022, the content of which is incorporated herein by reference.

FIELD OF THE ART

The present invention relates to a seat for a vehicle.

FRONT ART

The seat of a vehicle consists of a seating (cushion) having a substantially horizontal arrangement and of a backrest having a substantially vertical arrangement.

The seats are one of the elements of the vehicle that most affects passenger comfort as they constitute the interface through which the passengers come into physical contact with the vehicle. Currently, the seats are designed looking for the best possible compromise in order to meet a wide range of passenger sizes and a wide range of driving conditions (for example, for a long journey on roads open to the public, comfort should be privileged and whereas in track driving, containment should be privileged); consequently, the seats allow almost to all people to obtain a good (or in some cases acceptable) level of comfort in all driving conditions but they hardly allow people to obtain a high level of comfort in all driving conditions.

Patent application FR2850848A1 describes a seat for a vehicle, wherein a reversible cover provided which is removable by means of hinges and extends over the seat ng and over the backrest.

Patent application FR3014780A1 describes a reversible cover element for a seat of an automobile having two opposite aces that can be used alternatively.

Patent application US2008061610A1 describes a cover for a portion of a seat of a motor vehicle and comprising a panel couplable with a fixing mechanism mounted on the padding layer of the seat of the vehicle.

Patent application JPH11113690 describes a mounting structure of a seat cover on a main body of a seat of the vehicle; first magnetic locks are mounted near a peripheral edge of the main body of the seat and in a channel formed on the surface of the main body of the seat and corresponding second magnetic locks are mounted on the inner face of the seat cover.

DISCLOSURE OF THE INVENTION

Aim of the present invention is to provide a seat for a vehicle that allows to offer high comfort to all the occupants and in all driving conditions.

According to the present invention a seat for a vehicle is provided, according to what is claimed in the appended claims.

The claims describe preferred embodiments of the present invention forming an integral part of the present disclosure.

BRIEF DESCRIPTION OF THE DRAWINGS

The present invention will now be described with reference to the accompanying drawings, which show a non-limiting embodiment thereof, wherein.

PREFERRED EMBODIMENTS OF THE INVENTION

Figure 2:
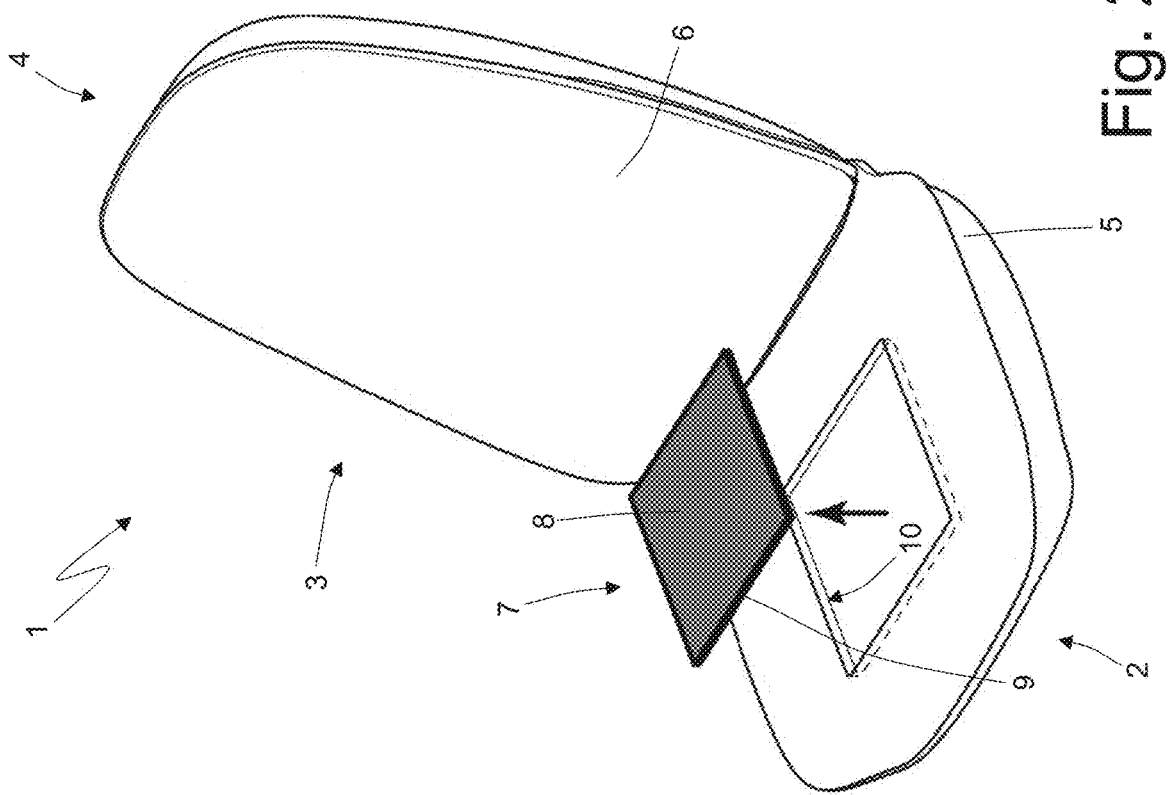
FIG. 2 is a perspective and partially exploded view of the seat of FIG. 1.
Figure 1:
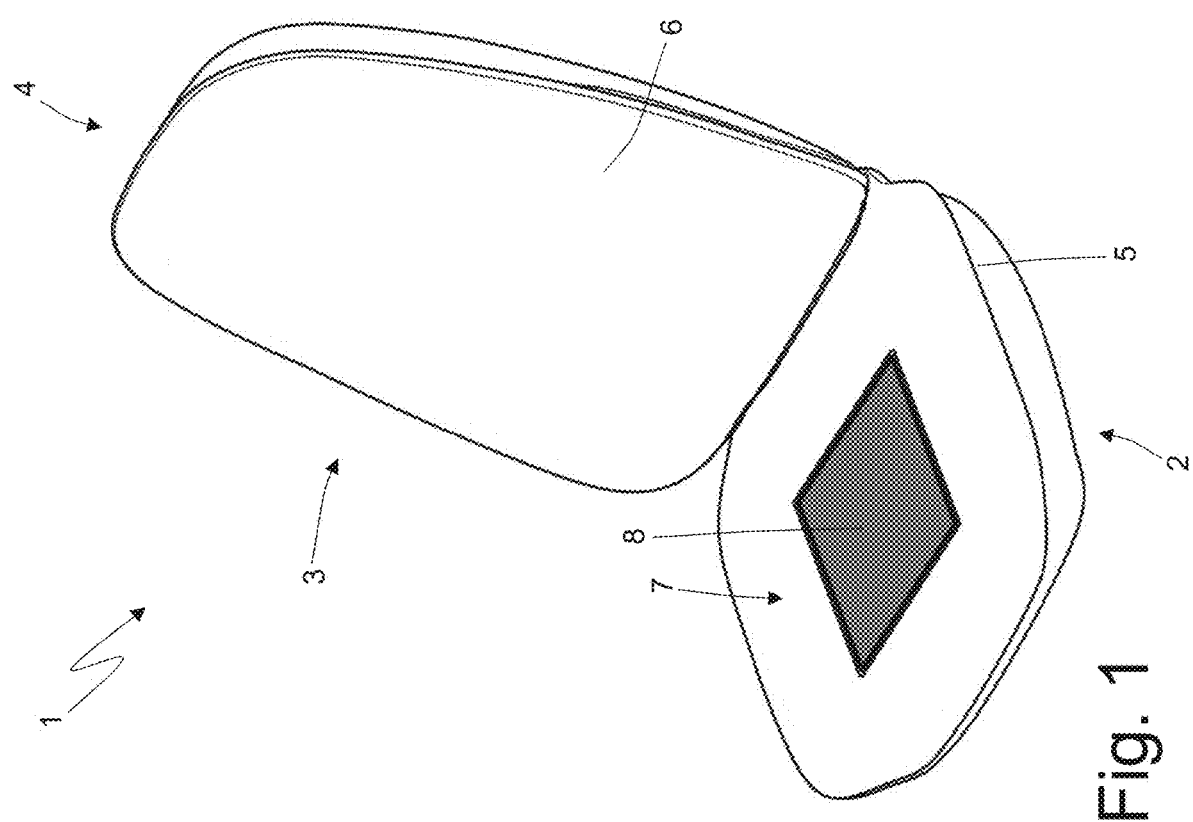
FIG. 1 is a perspective view of a seat for a vehicle made in accordance with the present invention.

FIGS. 1 and 2, number 1 denotes as a whole a seat of the vehicle.

The seat 1 is divided into a seating 2 (cushion) having a substantially horizontal arrangement and into a backrest 3 having a substantially vertical arrangement; together, the seating 2 and the backrest 3 give the seat 1 an "L" shape. The backrest 3 ends at the top with a headrest 4 which is integrated with the backrest itself (i.e. forms a single indivisible body with the backrest 3).

From a constructive point of view, the seat 1 comprises a base structure 5 configured to be fixed to a floorboard of the vehicle and a cover 6 that is fixed above the base structure 5, covers the base structure 5 and constitutes the outermost part of the seat 1, that is, it constitutes the aesthetic and tactile interface with the outside.

The cover 6 comprises (at least) a reversible (foldable down) component 7 which fixed to the rest of the seat 1 (i.e. to the rest of the cover 6) in a separable manner and has two opposite faces 8 and 9, each capable of being arranged outwards or, alternatively, inwards reversing the orientation of the reversible component 7. In other words, the reversible component 7 is of the "double race" type and can be coupled to the rest of the seat 1 (i.e. to the rest of the cover 5) with the face 8 facing outwards (therefore visible) and with the face facing inwards (therefore resting on the base structure 5 and hidden from view) or can be coupled to the rest of the seat 1 (i.e. to the rest of the cover 6) with the face 9 facing outwards (therefore visible) and with the face 8 facing inwards (therefore resting on the base structure and hidden from view).

Consequently, a user can manually reverse (fold down) the reversible component 7 so as to invert the face 8 or 9 of the reversible component 7 that is visible (i.e. is facing outwards).

Figure 3:
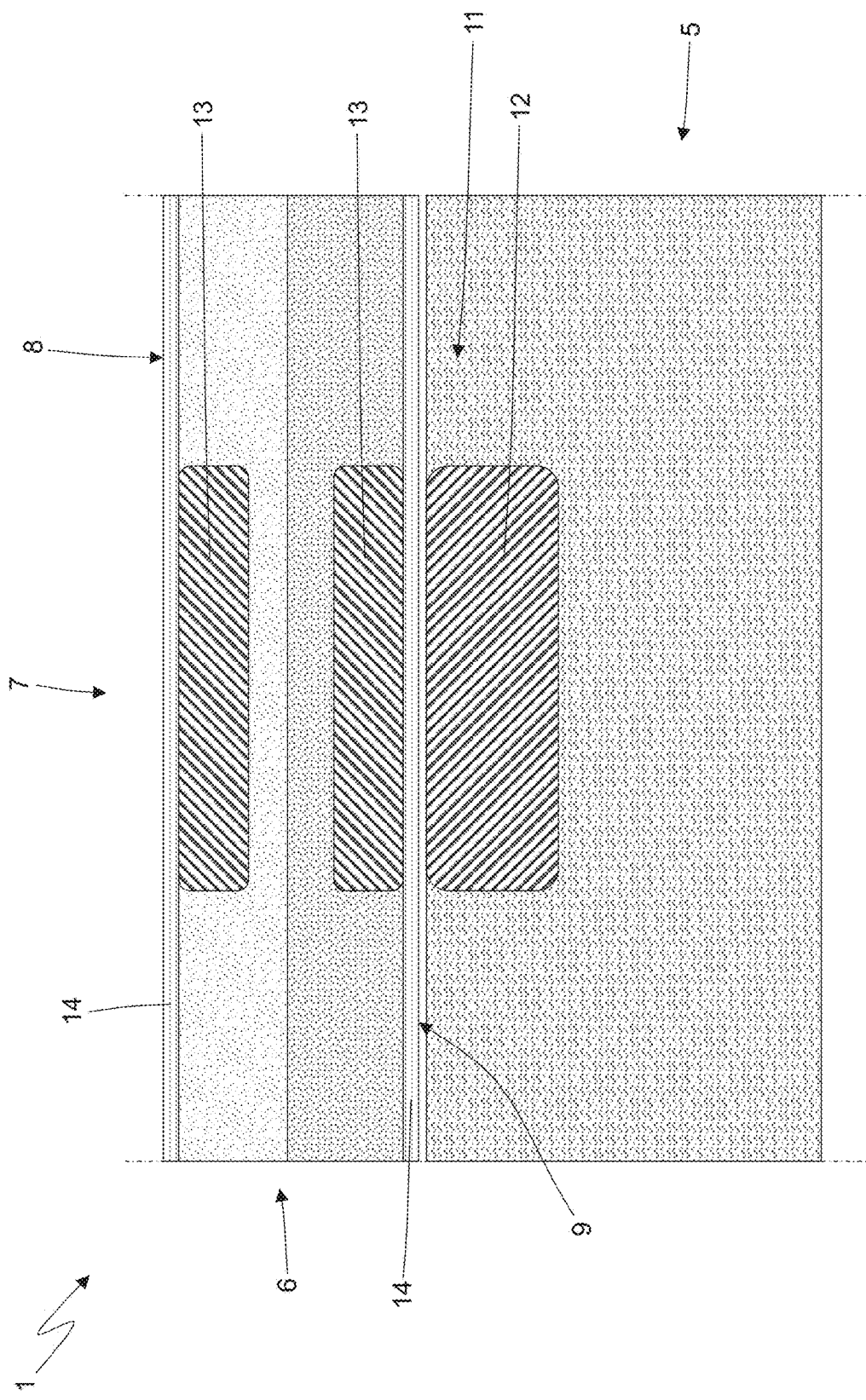
FIG. 3 is a sectional view of part of the seat of FIG. 1.

Obviously, the eve component 7 is asymmetrical (as schematically shown in FIG. 3), i.e. the face 8 of the reversible component 7 has different characteristics from the face 9 of the reversible component 7. The two faces 8 and 9 of the reversible component 7 can be different from each other in the surface colouring, in the material that makes up the surface finish (for example the face 8 could have a leather surface finish while the face 9 could have a surface finish in alcantara), in the shape (for example the face 8 could be flatter and therefore more comfortable while the face 9 could be more excavated and therefore with more containment), or in the rigidity (yielding) of the material that is close to the two faces 8 and 9 (for example the face 8 could be less rigid and therefore more comfortable while 15 the face 9 could be more rigid). That is, a less rigid foam may be present near the face 8 while a more rigid foam may be present near the face 9.

According to what is shown in FIG. 2, the cover 6 comprises a seat 10 (i.e. a through opening) in which the reversible component 7 is arranged; i.e. the seat 10 reproduces in negative the shape of the reversible component 7 so as to be able to accommodate inside it the reversible component 7 without appreciable play (indeed, optionally with a small interference that forces the reversible component 7 to compress elastically and slightly). The seat 10 consists of a through passing through the cover 6 so that on the bottom the reversible component 7 rests directly on the underlying base structure 5.

According to what is shown in FIG. 3, a series of connection devices 11 are provided (only one of which is shown FIG. 3) which connect the reversible component 7 of the cover 6 to the base structure 5. That is, according to what is shown in FIG. 3, the reversible component 7 of the cover 6 is connected to the base structure 5 by means of series of connection devices 11 which are preferably distributed along the outer edge of the reversible component 7. Then, the connection devices 11 are configured to alternatively connect each face 8 or 9 of the reversible component 7 to the base structure 5.

According to what is shown in FIG. 3, each connection device 11 is of the magnetic type (i.e. it entails a magnetic coupling creating the joining force through magnetic attraction) and comprises a body 12 integral to the base structure 5 and two bodies 13 that are integral to the two opposite faces 8 and 9 of the reversible component 7 (i.e. one body 13 is arranged in the area of the face 8 while the other body 13 is arranged in the area of the face 9) and are each configured to be magnetically attracted by the body 12. According to a possible embodiment, in each connection device 11 both bodies 12 and 13 are permanent magnets (obviously with reversed magnetic poles so as to attract one another). According to an alternative embodiment, only one of the two bodies 12 and 13 is a permanent magnet while the other of the two bodies 12 and 13 is a piece of ferromagnetic metal.

According to a preferred embodiment, in each connection device 11 the body 12 integral to the base structure 5 is larger (and therefore heavier) than the bodies 13 integral to the reversible component 7 of the cover 6 so as to reduce the overall weight of the reversible component 7 while maintaining an adequate force of attraction between the reversible component 7 and the base structure 5. In other words, in each connection device 11, instead of making bodies 12 and 13 of equal mass, mass is moved on the body 12 integral to the base structure 5 to reduce the mass of the bodies 13 integral to the reversible component 7 of the cover 6.

According to a possible embodiment, in each connection device 11, a light layer of non-ferromagnetic material is always Interposed between the two bodies 12 and 13 to avoid a direct contact between the two bodies 12 and 13 and therefore avoid a "magnetic bonding", that is, prevent the two bodies 12 and 13 from joining with a too high a magnetic force of attraction that becomes difficult to overcome when it is necessary to remove the reversible component 7 of the cover 6. For example, according to what is shown in FIG. 3, the bodies 13 are arranged under a finishing layer 14 so as to be hidden from. view and so that the finishing layer 14 (which is made of non-ferromagnetic material) is always interposed between each body 13 and the corresponding body 12.

According to the preferred embodiment shown in the appended figures, the connection devices 11 are of the magnetic type. According to other embodiments, the connection devices 11 are of another type; for example, the connection devices 11 are of a mechanical type and use an interference (i.e. an elastic deformation) or a screwing to create the coupling.

Some or all of the connection devices 11 are configured to connect a side wall (perpendicular to the faces 8 and 9) of the reversible component 7 to a side wall of the seat 10. In this case, each connection device 11 comprises the body 12 integral to the cover 6 in the area of the seat 10 and the body 13 which is integral to the reversible component 7 and is configured to create a firm joint with the body 12; in particular, each connection device 11 comprises a single body 12 integral to the cover 6 in the area of the seat 10 and a single body 13 which is integral to the reversible component 7 and is configured to create a firm joint with the body 12. In addition, some connection devices 11 configured to connect, alternatively, each opposite face 8 or 9 of the reversible component 7 to the base structure 5 could also be provided.

In the embodiment shown in FIGS. 1 and 2, a single reversible component 7 arranged in the area of the seating 2 is provided; according to other embodiments not shown, a single reversible component 7 arranged in the area of the backrest 3 or of the headrest 4 is provided, several reversible components 7 all arranged in the area of the seating 2, the backrest 3 or the headrest 4 are provided, or several reversible components 7 arranged in the area of the seating 2, the backrest 3 and/or the headrest 4 are provided.

It is important to point out that the seat I can be a single seat arranged in the front or rear position (as shown in the appended figures) or it can be a double or triple seat arranged in the rear position; in this case, the seat 1 preferably comprises a single base structure 5 that accommodates two or three different covers 3.

The embodiments described herein can be combined with each other without departing from the scope of protection of the present invention.

The seat 1 described above has numerous advantages.

Firstly, the seat 1 described above makes it possible to offer high comfort to all the occupants, i.e. to all passengers using the seat 1, and in all driving conditions. This result is obtained in that a base structure 5 is used that is permanently fixed to the floorboard of the vehicle and is common to all the passengers using the seat 1 and in all driving conditions (i.e. it always remains the same for all the passengers using the seat 1 and in all driving conditions) and a cover 6 that is (easily and quickly) modifiable by reverting the reversible component 7 and therefore can be customised for each passenger using the seat 1 also as a function of the driving conditions.

In addition, the seat 1 described above also allows the aesthetic appearance of the seats 1 to be varied quickly, allowing the owner of the vehicle to substantially vary the aesthetic appearance of the passenger compartment.

Finally, the seat 1 described above can be made relatively easily and quickly using a commercial three-dimensional printer for the production of the reversible components 7 of the covers 6.

LIST OF REFERENCE NUMBERS OF THE FIGURES 1 seat
2 seating
3 backrest
4 headrest
5 base structure
6 cover
7 reversible component
8 face
9 face
10 seat 11 connection devices
12 body
13 body
14 finishing layer

The invention claimed is:
1. A seat (1) for a vehicle and comprising:
   a base structure (5) configured to be fixed to a floorboard of the vehicle;
   a cover (6) which covers the base structure (5), constitutes the outermost part of the seat (1) and comprises at least one reversible component (7) which is fixed to the rest of the seat (1) in a separable manner and has two opposite faces (8, 9), each capable of being arranged outwards or, alternatively, inwards reversing the orientation of the reversible component (7); and
   a series of connection devices (11), which connect the reversible component (7) to the base structure (5);
   wherein the cover (6) comprises a seat (10) in which the reversible component (7) is arranged;
   wherein at least one first connection device (11) is configured to connect a side wall of the reversible component (7) to a side wall of the seat (10) and comprises: a first body (12) integral to the cover (6) in the area of the seat (10) and a second body (13) which is integral to the reversible component (7) and is configured to create a firm joint with the first body (12);
   wherein the first connection device (11) entails a magnetic coupling creating the joining force through magnetic attraction between the first body (12) and the second body (13);
   wherein at least one second connection device (11) is configured to alternatively connect each opposite face (8, 9) of the reversible component (7) to the base structure (5);
   wherein the second connection device (11) comprises: only one first body (12) integral to the base structure (5); and two second bodies (13) which are independent and separate from each other, are integral to the reversible component (7), are arranged on the respective opposite faces (8, 9) of the cover (6), and are each configured to create a firm joint with the first body (12); and
   wherein the second connection device (11) entails a magnetic coupling creating the joining force through magnetic attraction between the first body (12) and each second body (13).

2. The seat (1) according to claim 1, wherein in the second connection device (11) the first body (12) and the two second bodies (13) are permanent magnets with reversed magnetic poles so as to attract one another.

3. The seat (1) according to claim 1, wherein, in the second connection device (11), the first body (12) integral to the base structure (5) is larger, namely has a larger mass, than each second body (13) integral to the cover (6).

4. The seat (1) according to claim 1, wherein, in the second connection device (11), a non-ferromagnetic material layer is interposed between the first body (12) and each second body (13).

5. The seat (1) according to claim 1, wherein the second connection device (11) entails a mechanical coupling between the first body (12) and each second body (13).

6. The seat (1) according to claim 1, wherein in the first connection device (11) the first body (12) and the second body (13) are permanent magnets with reversed magnetic poles so as to attract one another.

7. The seat (1) according to claim 1, wherein in the first connection device (11) the first body (12) integral to the cover (6) in the area of the seat (10) is larger, namely has a larger mass, than the second body (13) integral to the reversible component (7).

8. The seat (1) according to claim 1, in the first connection device (11), a non-ferromagnetic material layer is interposed between the first body (12) and the second body (13).

9. The seat (1) according to claim 1, wherein the first connection device (11) comprises a single first body (12) integral to the cover (6) in the area of the seat (10) and a single second body (13) which is integral to the reversible component (7) and is configured to create a firm joint with the first body (12).

10. The seat (1) according to claim 1, wherein the seat (10) has a through. opening of the cover (5) so that on the bottom the reversible component (7) rests directly on the underlying base structure (5).

11. The seat (1) according to claim 1, wherein the seat (10) reproduces in negative the shape of the reversible component (7) so to be able to accommodate inside it the reversible component (7) without appreciable play.

12. The seat (1) according to claim 1, wherein the seat (10) reproduces in negative the shape of the reversible component (7) so as to be able to accommodate inside it the reversible component (7) with an interference that requires the reversible component (7) located in the seat (10) to be elastically compressed.

13. The seat (1) according to claim 12, wherein, in the connection device (11), the first body (12) integral to the base structure (5) is larger, namely has a larger mass, than each second body (13) integral to the cover (6).

14. The seat (1) according to claim 12, wherein, in the connection device (11), a non-ferromagnetic material layer is interposed between the first body (12) and each second body (13).

15. The seat (1) according to claim 12, wherein the connection device (11) entails a mechanical coupling between the first body (12) and each second body (13).

16. A seat (1) for a vehicle and comprising:
   a base structure (5) configured to be fixed to a floorboard of the vehicle;
   a cover (6) which covers the base structure (5), constitutes the outermost part of the seat (1) and comprises at least one reversible component (7) which is fixed to the rest of the seat (1) in a separable manner and has two opposite faces (8, 9), each capable of being arranged outwards or, alternatively, inwards reversing the orientation of the reversible component (7); and
   a series of connection devices (11), which connect the reversible component (7) to the base structure (5);
   wherein the cover (6) comprises a seat (10) in which the reversible component (7) is arranged;
   wherein at least one connection device (11) is configured to alternatively connect each opposite face (8, 9) of the reversible component (7) to the base structure (5);
   wherein the connection device (11) comprises: only one first body (12) integral to the base structure (5); and two second bodies (13) which are independent and separate from each other, are integral to the reversible component (7), are arranged on the respective opposite faces (8, 9) of the cover (6), and are each configured to create a firm joint with the first body (12); and
   wherein the connection device (11) entails a magnetic coupling creating the joining force through magnetic attraction between the first body (12) and each second body (13).

17. The seat (1) according to claim 16, wherein in the connection device (11) the first body (12) and the two second bodies (13) are permanent magnets with reversed magnetic poles so as to attract one another.

\* \* \* \* \*